United States Patent [19]

Priest et al.

[11] 3,933,693
[45] Jan. 20, 1976

[54] PRODUCTION OF FLAME RETARDANT FLEXIBLE POLYURETHANE FOAMS

[75] Inventors: David C. Priest, Charlotte, N.C.; John E. Brandien, deceased, late of Mooresville, N.C., by Helen Brandien, executrix

[73] Assignee: Reeves Brothers Inc., New York, N.Y.

[22] Filed: June 24, 1974

[21] Appl. No.: 482,151

[52] U.S. Cl. ........ 260/2.5 AJ; 180/90; 260/2.5 AM
[51] Int. Cl.$^2$ .................. C08G 18/32; B62D 25/14
[58] Field of Search .................. 260/2.5 AJ, 2.5 AM

[56] References Cited
UNITED STATES PATENTS

| | | | |
|---|---|---|---|
| 3,630,973 | 12/1971 | Ardis et al. | 260/2.5 AJ |
| 3,738,953 | 6/1973 | Anorga et al. | 260/2.5 AM |
| 3,773,696 | 11/1973 | Papa et al. | 260/2.5 AJ |
| 3,779,953 | 12/1973 | Papa et al. | 260/2.5 AJ |
| 3,812,047 | 5/1974 | D'Alelis et al. | 260/2.5 AM |
| 3,833,665 | 9/1974 | Papa et al. | 260/2.5 AJ |

*Primary Examiner*—H. S. Cockeram
*Attorney, Agent, or Firm*—Pennie & Edmonds

[57] ABSTRACT

Flame retardant flexible polyurethane foams having a porosity in the range between 0.5 and 10 cubic feet per minute and meeting all of the requirements of Motor Vehicle Safety Standard Docket 302 may be produced from tolylene diisocyanate (which is a mixture of the 2,4- and 2,6-isomers) and polyether polyols without downgrading the flexibility or the porosity of the foam by (a) using in the polymerization reaction a tolylene diisocyanate in which the 2,4- to 2,6-isomer ratio is such that the tolylene diisocyanate contains not more than about 76 percent by weight of the 2,4-isomer, and (b) incorporating into the reaction medium prior to polymerization from about 1 to about 8 percent by weight of dibromoneopentyl glycol in a form such that the dibromoneopentyl glycol can be polymerized with the other reactants in the foam matrix, the weight of the dibromoneopentyl glycol being based on the weight of the polyether polyol used in the polymerization reaction. Best results have been obtained when the dibromoneopentyl glycol is incorporated in the reaction medium, either in the form of a dispersion or a solution of dibromoneopentyl glycol in the polyether polyol, using a tolylene diisocyanate in which the 2,4- to 2,6-isomer ratio is such that the tolylene diisocyanate contains 72.5 ± 2 percent by weight of the 2,4-isomer and 27.5 ± 2 percent by weight of the 2,6-isomer.

7 Claims, No Drawings

PRODUCTION OF FLAME RETARDANT FLEXIBLE POLYURETHANE FOAMS

BACKGROUND OF THE INVENTION

This invention relates to the production of flexible polyurethane foams by a process involving the reaction of tolylene diisocyanate with a polyether polyol in the presence of a small amount of water and a catalytic amount of a polymerization catalyst. More particularly, the invention provides an improved method for flame retarding such polyurethane foams by incorporating dibromoneopentyl glycol into the foam matrix without downgrading the flexibility or porosity of the foam.

Flexible polyurethane foams made from tolylene diisocyanate and a polyether polyol comprise a very large segment of the polyurethane foam industry and are extensively used in fabricating automobile and furniture upholstery. Because of the inherent combustibility of polyurethane foams, which generally burn uncontrollably after ignition, there has been an extensive effort in the polyurethane foam industry during the past several years to produce flame retardant foams. These efforts have been stimulated by recent governmental regulations requiring improved safety standards for polyurethane foams used in automobiles, one of the most important of which regulations is Motor Vehicle Safety Standard Docket 302, published in the Federal Register on Jan. 8, 1971 and effective Sept. 1, 1972.

Flame-proofing flexible polyurethane foams, which have an open-cell porous structure, is much more difficult than flame-proofing closed-cell rigid foams, since open-cell structures permit the flame to obtain oxygen through the back face of the porous structure and also permit any volatilizable flame retardant to escape ahead of the flame front.

Many different methods have been suggested and commercially tested for flame retarding flexible polyurethane foams, all of which methods involve the addition to the foam reactants of some flame retardant prior to or during the polymerization reaction so that the flame retardant is uniformly distributed throughout the resultant foam. For convenience, these flame retardants may be characterized as either (1) non-reactive inorganic compounds which remain as discreet solid particles after dispersion through the foam matrix, (2) non-reactive organic compounds which remain dissolved in or dispersed throughout the foam matrix but are not chemically bound to or as part of the foam matrix, and (3) reactive organic compounds which enter into the polymerization reaction and become chemically bound as part of the foam matrix. Each of these methods presents difficulties.

The most common example of the first class of flame retardants, namely the non-reactive inorganic compounds which remain as discreet solid particles after dispersion throughout the foam matrix, is illustrated by the use of antimony trioxide and zinc oxide. As shown in U.S. Pat. No. 3,574,149, flame retardant flexible polyurethane foams may be obtained by dispersing in the foam reactants a mixture of antimony trioxide and zinc oxide in polyvinyl chloride. Insofar as these solid flame retardants are not compatible with the polyurethane foam matrix, flame retardancy is reduced and may be lost during washing and/or humid ageing of the foam. Moreover, since the required use level of these additives ranges from 20 to 30 percent by weight of the total weight of the foam reactants, this system always changes the foam properties. Finally, a high bun exotherm (in which the interior temperature of the polyurethane foam bun reaches temperatures in excess of 150°C.) results in a scorching of the interior of the foam due to the presence of any thermally unstable polyvinyl chloride.

The second class of flame retardants used in flame-proofing flexible polyurethane foams is the non-reactive organic additive which acts as a plasticizer when dissolved in or dispersed throughout the foam matrix. Examples of such plasticizers include the halogenated phosphonate-phosphite sold by Monsanto Company under the trademark Phosgard C-22R and described in U.S. Pat. No. 3,014,956, as well as 2,2-bis-(chloromethyl)trimethylene-bis-[di-(2-chloroethyl)phosphate] sold by Monsanto Company under the trademark Phosgard 2XC-20 and described in U.S. Pat. No. 3,192,242. Another example is tris-(2,3-dibromopropyl)phosphate which is sold by Michigan Chemical Company under the tradename LV-T23P. The use of halogenated phosphate esters in flexible foam for flame retardance results in mild to severe loss of foam properties, which is dependent on the use level of additive, and in mild to severe foam discoloration, which is dependent upon interior bun temperatures, with temperatures in excess of 150°C. often resulting in very severe darkening of the center of slabstock bun. On ageing, flame retardancy is often lost due to the small but finite vapor pressure of the halogenated phosphate plasticizer.

The third class of flame retardants suggested for flame-proofing polyurethane foams are those reactive organic compounds which enter into the polymerization reaction and become chemically bound as part of the foam matrix. Examples of such flame retardants may be found in the article by Parrish et al. J. Cellular Plastics, 5, 348–57 (1969) and in U.S. Pat. Nos. 3,257,337 and 3,597,503. Insofar as such reactive organic compounds contain halogen, their efficacy as flame retardants in polyurethane foams is related to the relative ease with which the resultant foam forms hydrogen chloride and/or hydrogen bromide in the flame. These non-burning gases are believed to interfere with the free-radical mechanism of the burning reaction and stabilize the system against free-radical decomposition of the polyether chains in the foam matrix.

The current trend in flame-proofing flexible polyurethane foams has been to seek methods of employing a copolymerizable flame retardant notwithstanding the fact that the past history of using such reactive flame retardants has been mostly of theoretical rather than practical value. The reason for this is that foam processing with reactive flame retardants has been so difficult that it has prevented the adoption of these flame retardants on a commercial scale. However, the preparation of small scale laboratory foams have shown that reactive flame retardants may be extremely efficient in preventing flame propagation and do not suffer from loss of effectiveness on long-term ageing. The major shortcoming to this approach is the difficulty experienced in producing flame retardant polyurethane foams on a commercial production basis.

Polybrominated polyols are known to impart flame retardancy to the polyurethane chains when copolymerized with the other reactants which form the urethane linkage. One such polybrominated polyol is dibromoneopentyl glycol ("DBNG"), the Geneva name for which is 2,2-bis-(bromomethyl)-1,3-propanediol. An early example of the use of dibromoneopentyl glycol to flame-proof polyurethane coating compositions (which are not foams) may be found in U.S. Pat. No. 3,542,740.

Although dibromoneopentyl glycol has been used as part of a complex ternary flame retardant system (containing antimony trioxide and a chlorinated hydrocarbon polymer) in flexible polyurethane foams made from tolylene diisocyanate and polymethylene polyphenylisocyanate interpolymerized with polyether polyols (as shown in U.S. Pat. No. 3,738,953), this copolymerizable flame retardant has never been used successfully as the only flame retardant in flexible polyurethane foams made from tolylene diisocyanate and polyether polyols because it has been impossible to incorporate dibromoneopentyl glycol in such urethane foam systems without obtaining closed or tight cell structures which, while suitable for flame retardance per se, make the resultant foam unsuitable for many uses.

SUMMARY OF THE INVENTION

Using either a solution of dibromoneopentyl glycol or a low viscosity (3000 to 7000 cps) dispersion of this flame retardant in a polyether polyol, it has been found that flame retardant flexible polyurethane foams may be produced from tolylene diisocyanate and a polyether polyol without downgrading the porosity or the flexibility of the foam only when the 2,4- to 2,6-isomer ratio of the tolylene diisocyanate is such that the tolylene diisocyanate contains not more than about 76 percent by weight of the 2,4-isomer. Under these circumstances, it is possible to obtain flame retardant flexible polyurethane foams with excellent physical properties using as little as about 1 to about 8 percent by weight of dibromoneopentyl glycol in the foam reaction medium, the weight of the diibromoneopentyl glycol being based on the weight of the polyether polyol used in the polymerization reaction.

Based on this discovery, the invention contemplates the improvement, in a process for producing flexible polyurethane foams having a porosity in the range from about 0.5 to about 10 cubic feet per minute, in which tolylene diisocyanate is reacted with a polyether polyol in the presence of a small amount of water and a catalytic amount of a polymerization catalyst, which comprises a. using in the polymerization reaction a tolylene diisocyanate in which the 2,4- to 2,6-isomer ratio is such that the tolylene diisocyanate contains not more than about 76 percent by weight of the 2,4-isomer; and b. incorporating into the reaction medium prior to polymerization from about 1 to about 8 percent by weight of dibromoneopentyl glycol in a form such that the dibromoneopentyl glycol can be polymerized with the other reactants in the foam matrix, the weight of the dibromoneopentyl glycol being based on the weight of the polyether polyol used in the polymerization reaction, thereby producing a flame retardant flexible polyurethane foam without downgrading the flexibility or porosity of the foam.

BASIC PARAMETERS OF THE PROCESS

To obtain commercial-grade flexible polyurethane foams in accordance with the invention, which foams have a porosity in the range between 0.5 and 10 cubic feet per minute (as measured by ASTM D-1564) and meet all of the requirements of Motor Vehicle Safety Standard Docket 302, the 2,4- to 2,6-isomer ratio of the tolylene diisocyanate used in the polymerization reaction must be such that the tolylene diisocyanate must not contain more than about 76 percent by weight of the 2,4-isomer. The bulk of the commercial tolylene diisocyanate which is sold to the polyurethane industry in the U.S. is a mixture of 80 percent 2,4-isomer and 20 percent 2,6-isomer, and most flexible foam formulations are based on use of this 80/20 tolylene diisocyanate. However, there is available a commercial tolylene diisocyanate which contains 65 percent 2,4-isomer and 35 percent 2,6-isomer.

The tolylene diisocyanate used in the process of the invention may be prepared by blending, prior to use in the polymerization reaction, the 80/20 tolylene diisocyanate with the 65/35 tolylene diisocyanate, preferably using from 75 to 25 parts by weight of the 80/20 tolylene diisocyanate and from 25 to 75 parts by weight of the 65/35 tolylene diisocyanate. Excellent results have been obtained when the flame retardant flexible polyurethane foams are prepared using tolylene diisocyanate which is a 50:50 blend of the 80/20 and the 65/35 tolylene diisocyanates. This blend contains 72.5 ± 2 percent by weight of the 2,4-isomer and 27.5 ± 2 percent by weight of the 2,6-isomer. Table I sets forth the 2,4- and 2,6-isomer contents of various blends of 80/20 ("T-80") and and 65/35 ("T-65") commercial-grade tolylene diisocyanates.

TABLE I

| Isomer Content of Tolylene Diisocyanate Blends | | |
|---|---|---|
| T-65/T-80 | 2,4-Isomer | 2,6-Isomer |
| 75/25 | 68.75 | 31.25 |
| 50/50 | 72.50 | 27.50 |
| 25/75 | 76.25 | 23.75 |

The selectively blended tolylene diisocyanate is reacted with a polyether polyol. Typical of such polyether polyols are the "Multranol" series of resins manufactured by Mobay Chemical Company, which are poly(propylene oxide/ethylene oxide) triols having molecular weights in the range from about 250 to about 6,000. Additional polyols, such as glycerol, hexanetriol, butanetriol, trimethylol propane trimethylol ethane and pentaerythritol, can be employed in the polymerization reaction with the polyether polyol to maintain the desirable —NCO/—OH ratio, which should be in the range between about 1:1 to about 1.8:1

Incorporating the dibromoneopentyl glycol in the reaction medium so that it can be polymerized with the other reactants and thereby become part of the foam matrix may prove to be a problem in commercial-scale operations, since DBNG is a solid having a melting point of 110°C. This problem may be obviated by using a solution or a dispersion of dibromoneopentyl glycol in the particular polyether polyol to be used for the reaction.

Solution of dibromoneopentyl glycol in a polyether polyol is readily accomplished by mild agitation and heating. Agitation at 70°–80°C for 20–30 minutes will readily effect clear stable solutions having a maximum of 15 percent concentration of DBNG in polyether polyols such as Multranol 7100 or 3900. Viscosity increase of the solution is minimal, a 10 percent solution of DBNG in Multranol 7100 having a viscosity of 800 cps at 24.5°C. compared to a polyol viscosity of about 600 cps.

Instead of using a solution of dibromoneopentyl glycol, a dispersion of DBNG in the polyether polyol may be used in the foam formulation. The dispersion of DBNG in polyether polyols is readily accomplished on a three-roll mill and, at dispersions of 40 to 50 percent, results in a very stable system of manageable viscosity. Using a three roll mill, dispersion of 40 parts by weight of DBNG in 60 parts by weight of Multranol 7100 polyether polyol resulted in a system of approximately 3,000 cps viscosity, while the 50 percent dispersion resulted in a 7,000 cps viscosity. The 50 percent dispersion may settle somewhat over several months, but may be readily redispersed.

Regardless of whether a solution or dispersion of dibromoneopentyl glycol is used, the amount of dibromoneopentyl glycol incorporated into the reaction medium to achieve flame retardancy should be in the range from about 1 to about 8 percent by weight, based on the weight of the polyether polyol used in the polymerization reaction. As the water level in the foam formulation is increased from 2 to 3 phr, there is a concomittant increase in the amount of DBNG required to flame proof the foam. As a general rule, as the water level is increased the minimum level of DBNG required to obtain a self-extinguishing, zero burn rate (SEO) under the Motor Vehicle Safety Standard Docket 302 test conditions bears the following relationship to the water level in the foam formulation:

| Water (php) | DBNG (php) |
|---|---|
| 2.0 | 2.0 |
| 3.0 | 4.0 |
| 3.65 | 6.0 |

The presence and/or use of conventional adjuvants employed in the production of polyurethanes, such as polymerization and gelation catalysts, emulsifiers, blowing agents and foam stabilizers do not interfere with the process according to the invention. Various antioxidants, such as 2,6-di-t-butyl-4-methylphenol, may also be incorporated into the foam formulation as a stabilizer.

EXAMPLES

The following examples which are illustrative of the ease with which flame retardant flexible polyurethane foams may be produced from tolylene diisocyanate and polyether polyols in accordance with the invention. In each of these examples (some of which are control tests for purposes of comparison), each component in the foam formulation is expressed in parts by weight per hundred parts by weight of polyether polyol (php) unless otherwise indicated. Where tradenames or trademarks are used to denote a particular component of the foam formulation, those components may be identified from the following list:

a. Multranol 3900 is a poly(propylene oxide/ethylene oxide) triol having a molecular weight of about 5,000 and sold by Mobay Chemical Company;

b. Multranol 7100 is a poly(propylene oxide/ethylene oxide) triol having a molecular weight of about 3,500 and sold by Mobay Chemical Company;

c. Mondur T-80 is tolylene diisocyanate containing 80 ± 1 percent of 2,4-tolylene diisocyanate and 20 ± 1 percent of 2,6-tolylene diisocyanate and is sold by Mobay Chemical Company;

d. Mondur T-65 is tolylene diisocyanate containing 65 ± 2 percent by weight of 2,4-tolylene diisocyanate and 35 ± 2 percent by weight of 2,6-tolylene diisocyanate and is sold by Mobay Chemical Company;

e. Y-6635 is a poly(methylsiloxane-polyoxyalkylene oxide) block copolymer sold by Union Carbide Corporation as a surfactant for flexible polyurethane foams; this surfactant is described in U.S. Pat. Nos. 3,657,305, 3,686,254 and 3,594,334;

f. A-1 is a polyurethane catalyst sold by Union Carbide Corporation and is a 70 percent solution of bis-(dimethylaminoethyl) ether in di-n-propylene glycol;

g. T-9/3 (Carstan 866) is a gellation catalyst sold by Cincinnati Millicron Chemicals, Inc. and is composed of 33⅓ percent by weight of stannous octoate and 66⅔ percent by weight of diisodecyl phthalate; and h. Freon 11 is trichlorofluoromethane, which is used as a blowing agent and is sold by E. I. duPont de Nemours & Company.

EXAMPLE I

The effect on the properties of flame retardant foams on varying the 2,4- and 2,6-isomer content of the tolylene diisocyanate used in the polymerization reaction is illustrated by the seven runs summarized in Table II. Except for the control (Run 7), 5 php of dibromoneopentyl glycol was used in each of these runs and was added to the foam formulation as a 10 percent solution of DBNG in Multranol 7100.

In Run 1, where only Mondur T-80 was used as the tolylene diisocyanate, the foam was tight and closed-celled although it had flame retardancy. Attempts to improve the cellular structure of the foam formulation in Run 1 by reduction of the catalyst level resulted in undesirably long rise times and even longer tack-free cure times, neither of which are compatible with efficient plant production and are economically undesirable.

In Runs 2 to 6, where varying blends of Mondur T-80 and T-65 were used, each of the resultant foams were open-celled and were self-extinguishing, with a zero burn rate as determined by Motor Vehicle Safety Standard Docket 302. In Run 7, where no DBNG was used and only Mondur T-80 was used as the tolylene diisocyanate, the foam had an open-celled structure but possessed no flame retardancy.

TABLE II

Effect on Properties of Flame Retardant Foams Upon Varying the 2,4- and 2,6-Isomer Content of the Tolylene Diisocyanate Used in the Polymerization

| Reactants | Proportions and Results | | | | | | |
|---|---|---|---|---|---|---|---|
|  | Run 1 | Run 2 | Run 3 | Run 4 | Run 5 | Run 6 | Run 7 |
| Multranol 7100 | 55.0 | 55.0 | 55.0 | 55.0 | 55.0 | 55.0 | 100.0 |
| Multranol 7100/DBNG (90/10) | 50.0 | 50.0 | 50.0 | 50.0 | 50.0 | 50.0 | — |
| Mondur T-80 | 42.10 | 31.6 | 25.25 | 21.05 | 10.5 | — | 37.95 |
| Mondur T-65 | — | 10.5 | 16.85 | 21.05 | 31.6 | 42.10 | — |

TABLE II-continued

Effect on Properties of Flame Retardant Foams Upon Varying the 2,4- and 2,6-Isomer Content of the Tolylene Diisocyanate Used in the Polymerization Proportions and Results

| Reactants | Run 1 | Run 2 | Run 3 | Run 4 | Run 5 | Run 6 | Run 7 |
|---|---|---|---|---|---|---|---|
| Y-6634 | 0.70 | 0.70 | 0.70 | 0.70 | 0.70 | 0.70 | 0.70 |
| T-9/3 (Carstan 866) | 0.65 | 0.75 | 0.80 | 0.90 | 1.10 | 1.40 | 0.90 |
| H$_2$O | 3.00 | 3.00 | 3.00 | 3.00 | 3.00 | 3.00 | 3.00 |
| A-1 | 0.10 | 0.10 | 0.10 | 0.10 | 0.10 | 0.10 | 0.10 |
| Properties | | | | | | | |
| CT/RT (See Note 1)(sec.) | 9/95 | 8/95 | 8/93 | 9/92 | 8/71 | 8/67 | 10/76 |
| Density, Pcf | 1.87 | 2.06 | 2.18 | 2.04 | 1.97 | 1.96 | 1.97 |
| Porosity cu ft./min | Tight Closed-Celled | 5.6 Open | 4.5 Open | 3.50 Open | 3.70 Open | 5.50 Open | — Open |
| Burn Time (See Note 2) | 6 sec. | 15 sec. | 14 sec. | 15 sec. | 20 sec. | 16 sec. | — |
| Burn Distance (See Note 3) | .40" | 1.0" | .95" | 1.0" | 1.20" | 1.10" | — |
| Burn Rating (See Note 4) | SEO | SEO | SEO | SEO | SEO | SEO | Burn |

1) CT/RT = cream time/rise time. Cream time is a visual indication of an extreme viscosity change in the foaming system. The formulation undergoes a change from a clear liquid to an opaque, creamy system. Initiation of foam rise occurs at the cream time. Rise time is that point at which the foaming mass ceases to rise and is indicative of how soon the foam bun may be handled by production personnel.
2) Burn time is the time in seconds that the test sample burned. Time zero is taken upon ignition of the sample. Insofar as test ignition time is 15 seconds, many of these samples extinguished during ignition time.
3) Burn distance is the distance the foam sample actually burned. Burn ratings are calculated after 1.50 inches has burned. All of the samples in Runs 1 to 6 have zero burn rates.
4) SEO = Self extinguishing with zero burn rate.

EXAMPLE II

Table III sets forth three runs for producing flame retardant flexible polyurethane foams, in which the dibromoneopentyl glycol was added to the foam formulation in the form of a dispersion of DBNG in the polyether polyol. In each of these runs, the tolylene diisocyanate was a 50:50 blend of Mondur T-80 and T-65. In Run 1, the DBNG was added in the form of a 40 percent dispersion of DBNG in Multranol 7100; in Run 2, the DBNG was added in the form of a 45 percent dispersion in Multranol 7100; and in Run 3, the DBNG was added in the form of a 50 percent dispersion in Multranol 7100.

TABLE III

Use of Dispersions of DBNG in Flame Proofing Proportions and Results

| Reactants | Run 1 | Run 2 | Run 3 |
|---|---|---|---|
| Multranol 7100 | 93 | 95 | 94 |
| DBNG | 7 | 5 | 7 |
| Mondur T-80 | 26.30 | 20.6 | 21.2 |
| Mondur T-65 | 26.30 | 20.6 | 21.2 |
| Y-6634 | 0.75 | 0.70 | 0.70 |
| A-1 | 0.10 | 0.10 | 0.10 |
| H$_2$O | 4.0 | 3.0 | 3.0 |
| T-9/3 (Carstan 866) | 0.75 | 0.95 | 0.70 |
| Properties | | | |
| Cream Time, sec. | 10 | 7 | 7 |
| Rise Time, sec. | 59 | 69 | 70 |
| Density, Pcf | 1.62 | 1.88 | 1.95 |
| Porosity | V. Open | V. Open | V. Open |
| Burn Distance | 1.05" | 1" | 1" |
| Burn Rating | SEO | SEO | SEO |

EXAMPLE III

As indicated previously, there is an interrelationship between the water level, amount of DBNG and the 2,4- and 2,6-isomer ratio of the tolylene diisocyanate which is critical in obtaining flame retardant foams without downgrading the flexibility or porosity of the foam. Table IV summarizes the results of an aggregate of seventeen runs in four series showing the effect on the properties of flame retardant foams upon varying the DBNG content and the water level in the foam formulation.

In the first series (Runs A-1 through A-5), from 1 to 5 php of DBNG were used at a water level of 1.95 php. In the second series (Runs B-1 to B-4), from 2 to 5 php of DBNG were used at a water level of 2.00 php. In the third series (Runs C-1 to C-4), from 3 to 7 php of DBNG were used at a water level of 3.00 php. All 13 of these runs showed excellent flame retardancy (self-extinguishing, zero burn rates) and yielded commercially acceptable foams.

In the fourth series (Runs D-1 to D-4), which used 3.65 php water level in the foam formulation, acceptable flame retardancy was obtained only in one run (Run D-4) where 6 php of DBNG was used, indicating the general rule that as the water level increases there must be a corresponding increase in the DBNG content to obtain satisfactory flame retardancy under the Motor Vehicle Safety Standard Docket 302.

EXAMPLE IV

Table V sets forth the results obtained when the DBNG content and 2,4- and 2,6-isomer content of the tolylene diisocyanate were varied while the water level was held at a constant 3.65 php. These results corroborate those observed in the previous examples.

TABLE IV

Effect on Properties of Flame Retardant Foams Upon Varying the DBNG Content and the Water level in the Foam Formulation Proportions and Results

| Reactants | Run A-1 | Run A-2 | Run A-3 | Run A-4 | Run A-5 | Run B-1 | Run B-2 | Run B-3 | Run B-4 |
|---|---|---|---|---|---|---|---|---|---|
| Multranol 3900 | 100.0 | 100.0 | 100.0 | 100.0 | 100.0 | — | — | — | — |
| Multranol 7100 | — | — | — | — | — | 100.0 | 100.0 | 100.0 | 100.0 |
| DBNG | 1.0 | 2.0 | 3.0 | 4.0 | 5.0 | 2.0 | 3.0 | 4.0 | 5.0 |
| Mondur T-80 | — | — | — | — | — | 11.8 | — | 12.35 | — |
| Mondur T-65 | 26.2 | 26.9 | 27.6 | 28.3 | 29.0 | 17.7 | 30.2 | 18.55 | 31.6 |
| Y-6634 | 0.60 | 0.60 | 0.60 | 0.60 | 0.60 | 0.60 | 0.60 | 0.60 | 0.60 |
| T-9/3 (Carstan 866) | 0.90 | 0.70 | 0.70 | 0.60 | 0.60 | 0.90 | 1.30 | 0.70 | 1.10 |
| H$_2$O | 1.95 | 1.95 | 1.95 | 1.95 | 1.95 | 2.00 | 2.00 | 2.00 | 2.00 |

TABLE IV-continued

Effect on Properties of Flame Retardant Foams Upon Varying the DBNG Content and the Water level in the Foam Formulation
Proportions and Results

| Reactants | Run A-1 | Run A-2 | Run A-3 | Run A-4 | Run A-5 | Run B-1 | Run B-2 | Run B-3 | Run B-4 |
|---|---|---|---|---|---|---|---|---|---|
| A-1 | 0.10 | 0.10 | 0.10 | 0.10 | 0.10 | 0.10 | 0.10 | 0.10 | 0.10 |
| Freon 11 | 3.00 | 3.00 | 3.00 | 3.00 | 3.00 | — | — | — | — |
| Properties | | | | | | | | | |
| CT/RT (sec.) | 12/142 | 12/143 | 13/157 | 13/160 | 13/158 | 13/158 | 11/115 | 13/168 | 11/124 |
| Density, Pcf | 2.82 | 2.70 | 2.72 | 2.72 | 2.72 | 2.76 | 2.70 | 2.85 | 2.80 |
| Porosity, cu ft./min. | 5.3 | 5.1 | 2.8 | 3.50 | 3.80 | 6.9 | 6.8 | 6.1 | 5.1 |
| Burn distance | 2.25" | 1.10" | .92" | .82" | .80" | .80" | .80" | .55" | .70" |
| Burn Rating | SE | SEO | SEO | SEO | SEO | SEO | SEO | SEO | SEO |

| Reactants | Run C-1 | Run C-2 | Run C-3 | Run C-4 | Run D-1 | Run D-2 | Run D-3 | Run D-4 |
|---|---|---|---|---|---|---|---|---|
| Multranol 7100 | 100.0 | 100.0 | 100.0 | 100.0 | 100.0 | 100.0 | 100.0 | 100.0 |
| DNBG | 3.0 | 4.0 | 5.0 | 7.0 | 3.0 | 4.0 | 5.0 | 6.0 |
| Mondur T-80 | 16.1 | 16.4 | 16.8 | 11.3 | 19.9 | 20.0 | 20.3 | 19.65 |
| Mondur T-65 | 24.2 | 24.6 | 25.0 | 33.9 | 29.9 | 30.0 | 30.45 | 29.45 |
| Y-6634 | 0.70 | 0.70 | 0.70 | 0.70 | 0.65 | 0.65 | 0.65 | 0.65 |
| T-9/3 (Carstan 866) | 1.15 | 1.00 | 0.90 | 0.90 | 1.10 | 1.10 | 0.90 | 0.70 |
| $H_2O$ | 3.00 | 3.00 | 3.00 | 3.00 | 3.65 | 3.65 | 3.65 | 3.65 |
| A-1 | 0.10 | 0.10 | 0.10 | 0.10 | 0.10 | 0.10 | 0.10 | 0.10 |
| Properties | | | | | | | | |
| CT/RT (sec.) | 9/91 | 11/103 | 11/111 | 11/102 | 13/79 | 11/64 | 13/90 | 11/85 |
| Density, Pcf | 1.95 | 1.93 | 1.99 | 2.05 | 1.70 | 1.92 | 1.74 | 1.70 |
| Porosity, cu ft./min | 8.7 | 9.4 | 8.9 | 9.7 | 9.9 | 8.4 | 9.1 | 8.9 |
| Burn Distance | 4.10" | 1.15" | 1.10" | .95" | 10" | 7.5" | 4.7" | 1.15" |
| Burn Rating | SE | SEO | SEO | SEO | Burn | Burn | SE | SEO |

TABLE V

Effect on Properties of Flame Retardant Foams Upon Varying the DBNG Content and the 2,4- and 2,6-Isomer Content of the Tolylene Diisocyanate Used in the Polymerization While Maintaining a Constant Water Level in the Foam Formulation
Proportions and Results

| Reactants | Run E-1 | Run E-2 | Run E-3 | Run E-4 | Run E-5 | Run E-6 |
|---|---|---|---|---|---|---|
| Multranol 7100 | 100.0 | 100.0 | 100.0 | 100.0 | 100.0 | 100.0 |
| DBNG | 0.0 | 3.0 | 4.0 | 5.0 | 6.0 | 8.0 |
| Mondur T-80 | 23.55 | 18.8 | 20.0 | 20.3 | 19.65 | 50.36 |
| Mondur T-65 | 23.55 | 28.2 | 30.0 | 30.45 | 29.47 | — |
| Y-6634 | 0.65 | 0.65 | 0.65 | 0.65 | 0.65 | 0.65 |
| T-9/3 (Carstan 866) | 1.50 | 1.30 | 1.10 | 0.90 | 0.90 | 0.20 |
| $H_2O$ | 3.65 | 3.65 | 3.65 | 3.65 | 3.65 | 3.65 |
| A-1 | 0.10 | 0.10 | 0.10 | 0.10 | 0.10 | 0.10 |
| Properties | | | | | | |
| CT/RT (sec.) | 11/72 | 11/71 | 11/64 | 13/90 | 11/85 | — |
| Density, Pcf | 1.72 | 1.73 | 1.72 | 1.74 | 1.70 | — |
| Porosity, cu ft./min | 8.2 | 8.6 | 8.4 | 9.1 | 8.9 | Closed; Shrink |
| Burn Distance | 10.0" | 10.0" | 7.2" | 4.8" | 1.0" | — |
| Burn Rating | Burn | Burn | Burn | SE | SEO | — |

EXAMPLE V

Trichlorofluromethane (Freon 11) and similar blowing agents may be used in producing the flame retardant flexible polyurethane foams according to the invention without diminishing the flame retardancy of the foam yet allowing the density to be altered. Table VI shows the results obtained with two identical formulations, differing only in that the second run used Freon as a blowing agent.

TABLE VI

Effect on Foam Properties on Using Freon

| Reactants | Run 1 | Run 2 |
|---|---|---|
| Multranol 7100 | 55 | 55 |
| Multranol 7100/DBNG (90/10) | 50 | 50 |
| Mondur T-80 | 21.05 | 21.05 |
| Mondur T-65 | 21.05 | 21.05 |
| Y-6634 | 0.70 | 0.70 |
| T-9/3 (Carstan 866) | 0.90 | 0.90 |
| $H_2O$ | 3.0 | 3.0 |
| A-1 | 0.10 | 0.10 |
| Freon 11 | — | 7.0 |
| Properties | | |
| CT/RT (sec.) | 9/92 | 7/76 |
| Density, Pcf | 2.04 | 1.41 |
| Porosity, cu. ft./min | 3.50 | 4.4 |
| Burn Time | Open 15 sec. | Very Open 17 sec. |
| Burn Distance | 1.0" | 1.40" |
| Burn Rating | SEO | SEO |

EXAMPLE VII

This example illustrates the necessity of adding the dibromoneopentyl glycol to the reaction medium in a form such that the DBNG can be polymerized with the other reactants to form part of the foam matrix. In this sample, the DBNG was used in the solid form in which it was received from the manufacturer, Dow Chemical Company.

| Reactants | Parts by Weight |
|---|---|
| Multranol 7100 | 100 |
| DBNG, as received | 5.0 |
| Mondur T-80 | 21.05 |
| Mondur T-65 | 21.05 |
| Y-6634 | 0.70 |
| T-9/3 (Carstan 866) | 0.90 |
| H₂O | 3.00 |
| A-1 | 0.10 |
| Properties | Results |
| Cream Time, sec. | 12 |
| Rise Time, sec. | 80 |
| Foam Quality | Good Open Foam |
| Burn Distance | 3.20" per minute |
| Burn Rating | Burned |

This foam lost 235 percent of the theoretical amount of DBNG after a 3 hour extraction with acetone, illustrating the necessity of dispersing or dissolving the DBNG in the polyether polyol prior to polymerization.

EXAMPLE VIII

When the DBNG is chemically incorporated into the foam matrix according to the invention, the flame retardancy of the foam is permanent and is not destroyed by dry cleaning. By way of illustration, eight flame retardant flexible polyurethane foams, each 4 × 10 inches in size and each flame retarded with 3.0 parts of DBNG per hundred parts of foam in accordance with the process of the invention, were separately subjected to repeated extraction with perchloroethylene and the solvent extracts concentrated from approximately 2 liters to 25 cc. An infrared scan of the concentrated perchloroethylene extract did not show any absorption bands characteristic of dibromoneopentyl glycol.

We claim:

1. In a process for producing flexible polyurethane foams having a porosity in the range from about 0.5 to about 10 cubic feet per minute, in which an isomeric mixture of 2,4- and 2,6-tolylene diisocyanate is reacted with a polyether polyol in the presence of a small amount of water and a catalytic amount of a polymerization catalyst, the improvement which comprises:

a. reacting the polyether polyol with a sufficient amount of an isomeric mixture of tolylene diisocyanate which contains not more than about 76 percent by weight of the 2,4-isomer, and b. incorporating into the reaction mixture prior to polymerization from about 1 to about 8 percent by weight of dibromoneopentyl glycol based on the weight of the polyether polyol used in the polymerization reaction.

2. A process for producing flame retardant flexible polyurethane foams according to claim 1, in which the tolylene diisocyanate used in the polymerization reaction has a 2,4-isomer content in the range from about 68 to about 76 percent by weight.

3. A process for producing flame retardant flexible polyurethane foams according to claim 1, in which the tolylene diisocyanate used in the polymerization reaction contains 72.5 ± 2 percent by weight of the 2,4-isomer and 27.5 ± 2 percent by weight of the 2,6-isomer.

4. A process for producing flame retardant flexible polyurethane foams according to claim 1, in which the dibromoneopentyl glycol is incorporated in the reaction medium in the form of a dispersion of dibromoneopentyl glycol in the polyether polyol.

5. A process for producing flame retardant flexible polyurethane foams according to claim 1, in which the dibromoneopentyl glycol is incorporated in the reaction medium in the form of a solution of dibromoneopentyl glycol in the polyether polyol.

6. A process for producing flame retardant flexible polyurethane foams according to claim 1, in which the polyether polyol is a poly(propylene oxide/ethylene oxide) triol having a molecular weight in the range from about 250 to about 6,500.

7. A process for producing flame retardant flexible polyurethane foams according to claim 1, in which from about 1.75 to about 4 percent by weight of water and from about 2 to about 8 percent by weight of dibromoneopentyl glycol are used in the polymerization reaction, both percentages being based on the weight of the polyether polyol used in the polymerization reaction.

* * * * *